R. R. FENNER.
Sulky-Plow.

No. 167,159. Patented Aug. 31, 1875.

Witnesses
Benjamin C. Pole
Albion R. Parris

Inventor
Robert R. Fenner
by C. S. Whitman
Atty

UNITED STATES PATENT OFFICE.

ROBERT R. FENNER, OF URBANA, ILLINOIS.

IMPROVEMENT IN SULKY-PLOWS.

Specification forming part of Letters Patent No. 167,159, dated August 31, 1875; application filed December 21, 1874.

*To all whom it may concern:*

Be it known that I, ROBERT R. FENNER, of Urbana, county of Champaign and State of Illinois, have invented certain Improvements in Sulky-Plows.

The following description, taken in connection with the accompanying plate of drawings hereinafter referred to, forms a full and exact specification, wherein are set forth the nature and principles of the invention, by which the same may be distinguished from others of a similar class, together with such parts thereof as are claimed as new and are desired to be secured by Letters Patent of the United States.

My invention relates to that class of plows commonly known as "sulky-plows;" and the nature thereof consists in certain improvements in the details of the construction of the same and novel combination of parts hereinafter shown and described.

Figure 1:
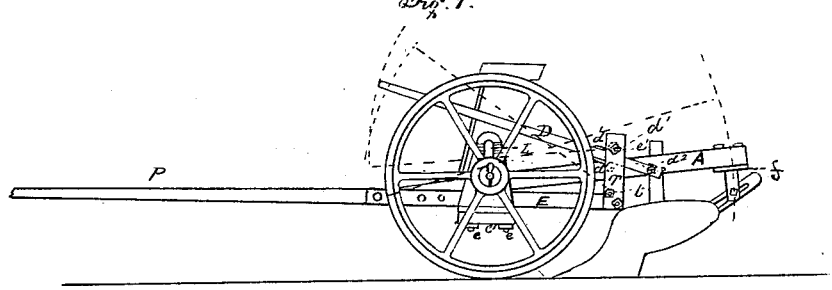
Figure 2:
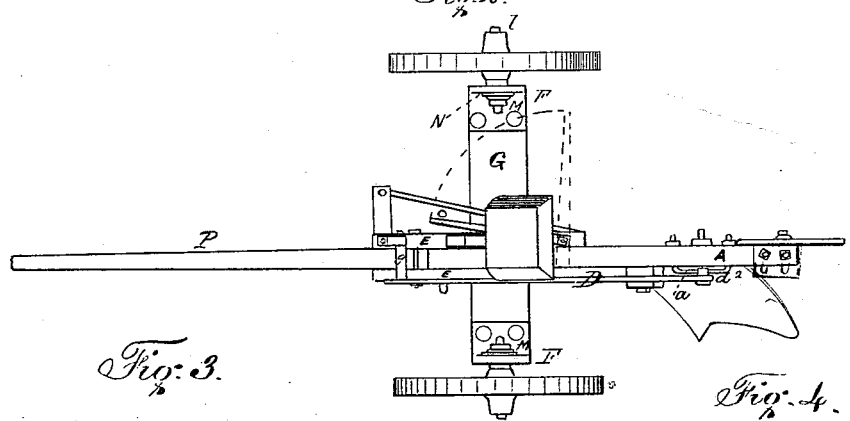
Figure 3:
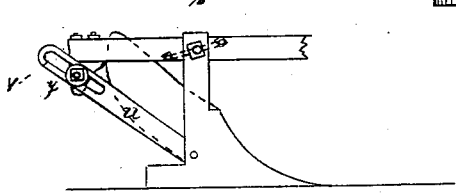
Figure 4:

In the accompanying plate of drawings, in which corresponding parts are designated by similar letters, Figure 1 is a lateral longitudinal elevation of the machine. Fig. 2 is a plan of the same. Figs. 3 and 4 illustrate, in detail, detached parts.

A designates the beam, the forward end of which is pivoted between the timbers E E, which timbers may be adjusted at any desirable point upon the axle G by means of the screw-bolts $e$ and metallic bars $e'$. The said beam is raised or lowered by means of the lever D, which is provided with fulcrum-irons $d$ $d^1$ on the upper and lower sides thereof. The lower fulcrum-iron $d$ may be hooked upon the lower bolt A', passing through the fulcrum-post T, and the upper fulcrum-iron $d^1$ may be hooked upon the upper bolt $e'$, passing through the said fulcrum-post. The upper bolt is, of course, made use of when it is desired to raise the beam to its greatest elevation. Upon the rear end of the said lever is an eye, $d^2$, through which passes the rod $a$, which is secured upon the said beam at an angle therewith.

When the operator desires to raise the plow he presses with his foot upon the said lever, and when he desires to force the plow downward he raises the lever with his hand. The timbers E prevent the said beam from being moved to the right or left and steady it in position.

When the operator desires the plow to run a little deeper for a short distance, he merely raises the forward end of the lever, and when he wishes to lower the plow from its raised position he simply disengages the said lever from the said fulcrum-post, and by it lowers the plow to the ground.

The depth of the furrow may be accurately regulated by raising the wheels and securing them in any desired position by means of the angular iron pieces F, which are rigidly attached to the extremities of the axle-beam G. The said angle-irons are provided with vertical oblong apertures, through which pass the spindles L, upon which the wheels revolve. Upon the sides of the said vertical apertures are arranged a series of teeth for the reception of corresponding teeth formed on the washers N upon the rod $l$ of the spindle. The said rods are flattened so that they will not turn in the said apertures, and are firmly secured to the said angle-bar by causing the teeth of the washers to engage with the teeth on the angle-bar, and then clamping the said washer firmly in position by means of the nut M.

When it is desired to cause the plow to take more land, the beam may be made to form a slight angle with the bar G by means of the bolt $e$ and metallic bars $e'$.

The plow-beam may be held in position, when either raised or lowered, by means of the lever $o$, which is pivoted to one of the timbers E. When the said beam is raised the short arm of the said lever is placed beneath it; when lowered, above it.

P designates the draft-bar, secured in position by bolts and by the brace $g$, to which the double-tree may be attached.

The point of the plow can be raised or lowered by means of the screw-bolt Y and the bar U, provided with an oblong aperture, $v$, through which the said bolt Y passes.

Having thus described the construction of my invention, I will indicate in the following clauses what I claim and desire to secure by Letters Patent of the United States—that is to say:

1. The lever D, provided with fulcrum-irons $d$ $d^1$, in combination with the fulcrum-post.

2. The combination of the following elements: the beam A, pivoted between the timbers E E, which may be adjusted to any desirable point upon the axle G, the lever D, provided with fulcrum-irons $d$ $d^1$, and the fulcrum-post T.

3. The combination of the following elements: the lever $o$, pivoted to one of the timbers E, timbers E E, plow-beam A, lever D, cross-bar $g$, and tongue P, as shown and described.

In testimony that I claim the foregoing I have hereunto set my hand.

ROBERT R. FENNER.

Witnesses:
M. LINDLEY,
J. A. MYERS.